US012289315B2

(12) United States Patent
Varma et al.

(10) Patent No.: US 12,289,315 B2
(45) Date of Patent: *Apr. 29, 2025

(54) SYSTEM AND METHOD FOR PERFORMING INTERACTIONS ACROSS GEOGRAPHICAL REGIONS WITHIN A METAVERSE (71) Applicant: Bank of America Corporation, Charlotte, NC (US)

(72) Inventors: Jayachandra Varma, Irving, TX (US); Manu Kurian, Dallas, TX (US); Lalit Dhawan, Cranbury, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,144

(22) Filed: May 14, 2024

(65) Prior Publication Data
US 2024/0305644 A1 Sep. 12, 2024

Related U.S. Application Data (63) Continuation of application No. 17/811,146, filed on Jul. 7, 2022, now Pat. No. 12,028,348.

(51) Int. Cl.
H04L 29/06 (2006.01)
G06F 21/31 (2013.01)
G06T 11/00 (2006.01)
H04L 9/40 (2022.01)
H04L 67/131 (2022.01)
H04L 67/306 (2022.01)
H04L 67/52 (2022.01)

(52) U.S. Cl.
CPC ............ *H04L 63/102* (2013.01); *G06F 21/31* (2013.01); *G06T 11/00* (2013.01); *H04L 67/131* (2022.05); *H04L 67/306* (2013.01); *H04L 67/52* (2022.05)

(58) Field of Classification Search
CPC .................................................... H04L 63/102
See application file for complete search history.

(56) References Cited

U.S. PATENT DOCUMENTS

| 7,824,253 | B2 | 11/2010 | Thompson et al. |
| 8,245,241 | B2 | 8/2012 | Hamilton, II et al. |
| 8,458,209 | B2 | 6/2013 | Clarke |
| 9,310,955 | B2 | 4/2016 | Haswell et al. |
| 9,338,200 | B2 | 5/2016 | Park et al. |
| 9,378,296 | B2 | 6/2016 | Clarke |

(Continued)

Primary Examiner — Bradley W Holder (57) ABSTRACT

A processor is configured to access a virtual environment comprising a plurality of virtual locations. The processor is configured to generate a primary avatar in a first virtual location based on a superset of the user data associated with a first set of the interaction criteria objects. The processor is configured to receive an interaction request from a user device for an interaction with the entity in a second virtual location. The processor is configured to generate a secondary set of user data based on the superset of the user data and the second set of the interaction criteria objects. The processor is configured to generate a secondary avatar associated with the user device in the second virtual location. The processor is further configured to conduct the interaction between the secondary avatar and the entity in the second virtual location based on the second set of the interaction criteria objects.

20 Claims, 3 Drawing Sheets (56) References Cited

U.S. PATENT DOCUMENTS

| | | |
|---|---|---|
| 9,563,902 B2 | 2/2017 | Haswell et al. |
| 9,875,580 B2 | 1/2018 | Cannon et al. |
| 10,203,762 B2 | 2/2019 | Bradski et al. |
| 10,326,667 B2 | 6/2019 | Jones et al. |
| 10,455,051 B2 | 10/2019 | Van Wie |
| 10,917,445 B2 | 2/2021 | Andon et al. |
| 10,928,974 B1 | 2/2021 | Gribetz |
| 11,412,011 B1* | 8/2022 | Benjamin ............... H04L 67/02 |
| 2009/0098939 A1* | 4/2009 | Hamilton ................ A63F 13/12 |
| | | 717/109 |
| 2009/0303984 A1 | 12/2009 | Clark et al. |
| 2014/0149094 A1* | 5/2014 | Takeuchi ............... G06V 20/53 |
| | | 703/6 |
| 2015/0379046 A1 | 12/2015 | Sundaresan et al. |
| 2023/0362213 A1* | 11/2023 | Bradley .............. H04L 65/1093 |

* cited by examiner

SYSTEM AND METHOD FOR PERFORMING INTERACTIONS ACROSS GEOGRAPHICAL REGIONS WITHIN A METAVERSE

CROSS-REFERENCE TO RELATED APPLICATION

The application is a continuation of U.S. patent application Ser. No. 17/811,146, filed Jul. 7, 2022, entitled "SYSTEM AND METHOD FOR PERFORMING INTERACTIONS ACROSS GEOGRAPHICAL REGIONS WITHIN A METAVERSE" which is incorporated herein by reference.

TECHNICAL FIELD

The present disclosure relates generally to information security, and more specifically to a system and method for performing interactions across geographical regions within a metaverse.

BACKGROUND

An organization entity may provide different services in different geographical regions through different systems or platforms in a network. A user generally performs actions with their same profile information and interacts with the organization entity. Services provided by the organization entity may not be available at a physical location in a particular geographical region. A user may access different systems or platforms to obtain services and perform interactions with the entity using their profile through the network. The entity may require their user profile to be compatible with technical restrictions associated with their corresponding geographical region, such as a state or country where the entity operates. Users from different geographical regions may not be able to interact with the entity using the same profile to perform interactions across platforms in different regions due to technical constraints that lead to network bottlenecks and congestion, inefficient use of computer resources, and other technical problems. Existing systems typically do not accept the user profile associated with the entity operating in one geographical region for the user to perform interactions with the entity operating in another geographical region.

SUMMARY

Current technology is not configured to provide an effective and efficient solution to perform interactions with organization entities across geographical regions in a network because of different security network and interaction restrictions and requirements associated with corresponding geographical regions. The system described in the present disclosure is particularly integrated into a practical application and provides technical solutions to the technical problems of previous systems. This disclosure provides various systems and methods for performing interactions across geographical regions within a virtual environment, such as a metaverse. This disclosure integrates services provided by the organization entities operating different systems or platforms in different geographical regions in a virtual environment.

In one embodiment, the system for performing interactions across geographical regions in a network includes a processor and a memory. The processor accesses a virtual environment which includes a plurality of virtual locations associated with corresponding virtual regions and geographical regions. Each virtual location in the virtual environment is associated with at least one entity operated in the real-world environment. The processor generates a primary avatar in a first virtual location in the virtual environment based on the superset of the user data associated with a first set of the interaction criteria objects. The first virtual location is associated with the first geographic region in the real-world environment. The processor receives an interaction request from a user device for an interaction with the entity in a second virtual location in the virtual environment. The processor determines a second geographic region in a real-world environment associated with the entity in the second virtual location in the virtual environment. The second geographic region is different from the first geographic region. The processor obtains a second set of interaction criteria objects specifying security network and interaction requirements for a user device with a corresponding user profile to securely access to and perform an interaction with the entity operating in the second geographic region in the real-world environment. The second set of the interaction criteria objects are different from the first set of the interaction criteria objects. The processor generates a secondary set of user data based on the superset of the user data and the second set of the interaction criteria objects. The processor generates a secondary avatar associated with the user device in the second virtual location and associates the secondary avatar with the secondary set of the user data. The processor conducts the interaction between the secondary avatar and the entity in the second virtual location in the virtual environment and generates a secondary user profile corresponding to the second set of the interaction criteria objects. In one embodiment, a memory is operable to store a plurality of sets of interaction criteria objects. Each set of interaction criteria objects specify a unique set of security network and interaction requirements for a user device with a corresponding user profile to securely access to and perform an interaction with a plurality of entities in a geographic region in a real-world environment. A primary user profile includes a superset of user data associated with a user account. The superset of the user data comprises a first set of interaction criteria objects and data of historical interactions between the user account and one or more entities in a first geographic region in the real-world environment.

In one embodiment, the processor analyzes the superset of the user data and generates a profile measurement associated with the primary user profile. The profile measurement is a unique alphanumeric value indicating an evaluation of the historical interactions between the user account and the one or more entities in the first geographic region. The processor determines whether the secondary avatar is qualified to interact with the entity in the second virtual location in the virtual environment based on the profile measurement and the second set of the interaction criteria objects. In response to determining that the secondary avatar is qualified to interact with the entity in the second virtual location in the virtual environment, the processor enables the secondary avatar to conduct the interaction with the entity in the second virtual location in the virtual environment. The secondary user profile includes the secondary set of the user data, the second set of the interaction criteria objects, and interaction data. The interaction data represents the interaction between the secondary avatar and the entity in the second virtual location in the virtual environment. Each set of the interaction criteria objects are associated with a unique geographic region and comprise at least one of objects of a geographical region, an interaction type, interaction exchange metrics, or security communication and interaction protocols. The primary user profile and the secondary user profile include one or more user login credentials for the primary avatar and the secondary avatar to enter the virtual environment.

The system described in the present disclosure provides technical solutions to the technical problems of the previous systems. For example, a crossing region interaction model and other software models or modules may be integrated into a software application associated with a server to process user communication data. The software application may be implemented by the processor to generate a primary avatar in the first virtual region based on a superset of the user data associated with a first set of interaction criteria objects and historical interactions occurred in the first geographical region. The software application may be implemented to generate a secondary avatar in the second virtual region and a secondary set of user data. The secondary set of user data is generated by the processor based on the superset of the user data associated with the first geographical region and the second set of the interaction criteria objects associated with the second geographical region. The user located in a second geographical region may be able to interact with the entity in a virtual location using the user profile data generated in the first geographical region while the first and second geographical region require different security network and interaction restrictions and requirements. In this way, the software application may be implemented to perform interactions across different geographical regions in the virtual environment in real time.

The disclosed system provides several practical applications and technical advantages that overcome the previously discussed technical problems. The disclosed information security device provides a practical application that improves the information security of the computer system by using virtual reality technology to integrate different security network and interaction restrictions and requirements by providing the security communication and interactions across different platforms and geographical regions in the computer system. The disclosed system may further be integrated into an additional practical application of improving the underlying operations of a computer system that is tasked to carry out operations to perform security communication and interactions while complying to the corresponding interaction criteria objects associated with different geographical regions. For example, the operations of the computer system are executed to implement processing and evaluating a super set of user data obtained in a first geographical region, generating a primary avatar at a first virtual location associated with a first geographic region, generating a secondary avatar at the second virtual location and a secondary set of user data associated with a second geographic region based on a super set of user data and the corresponding interaction criteria objects, conducting security interactions between the secondary avatar and the entity at the second virtual location. The disclosed system is directed to successful interactions by generating a regulated secondary user data based on corresponding interaction criteria objects which lead to security interactions across different platforms and geographical regions. The disclosed system improves information communication including data sharing and exchanging within the security network across geographical regions. Further, the disclosed system improves network and interaction security between the computer systems of the computer network across geographical regions.

The disclosed system improves the whole process to implement the task associated with different services, entities, systems, and platforms and is compatible with the security network and interaction restrictions and requirements associated with different geographical regions in the overall computer system via the network. The disclosed system may be integrated into a practical application executed to process communicated data associated with one geographical region by using the user profile data generated in another geographical region which requires different security network and interaction compliance on interactions. For example, the disclosed system may proactively build a secondary set of user data compatible with different security network and interaction restrictions and requirements associated with different geographical regions before performing interactions. In this way, the disclosed system may prevent the failed interactions which may lead to waste internet resources and computer resources of the computer system. Further, the system may avoid rebuilding a database and the secondary set of user data. Different entities, systems, and platforms may share or exchange data with each other, perform interactions with an entity in the virtual environment based on the security network and interaction restrictions and requirements associated with different geographical regions in the network. As a result, the disclosed system may reduce the bottleneck of the network, reduce an amount of computer resources without remedying interaction errors and reforging interactions. The practical application is executed to perform interactions to complete the corresponding task across different geographical regions quickly and efficiently in the virtual environment that would otherwise be spent using the current technology. Thus, this process provides information security and improves the operations of the overall computer system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
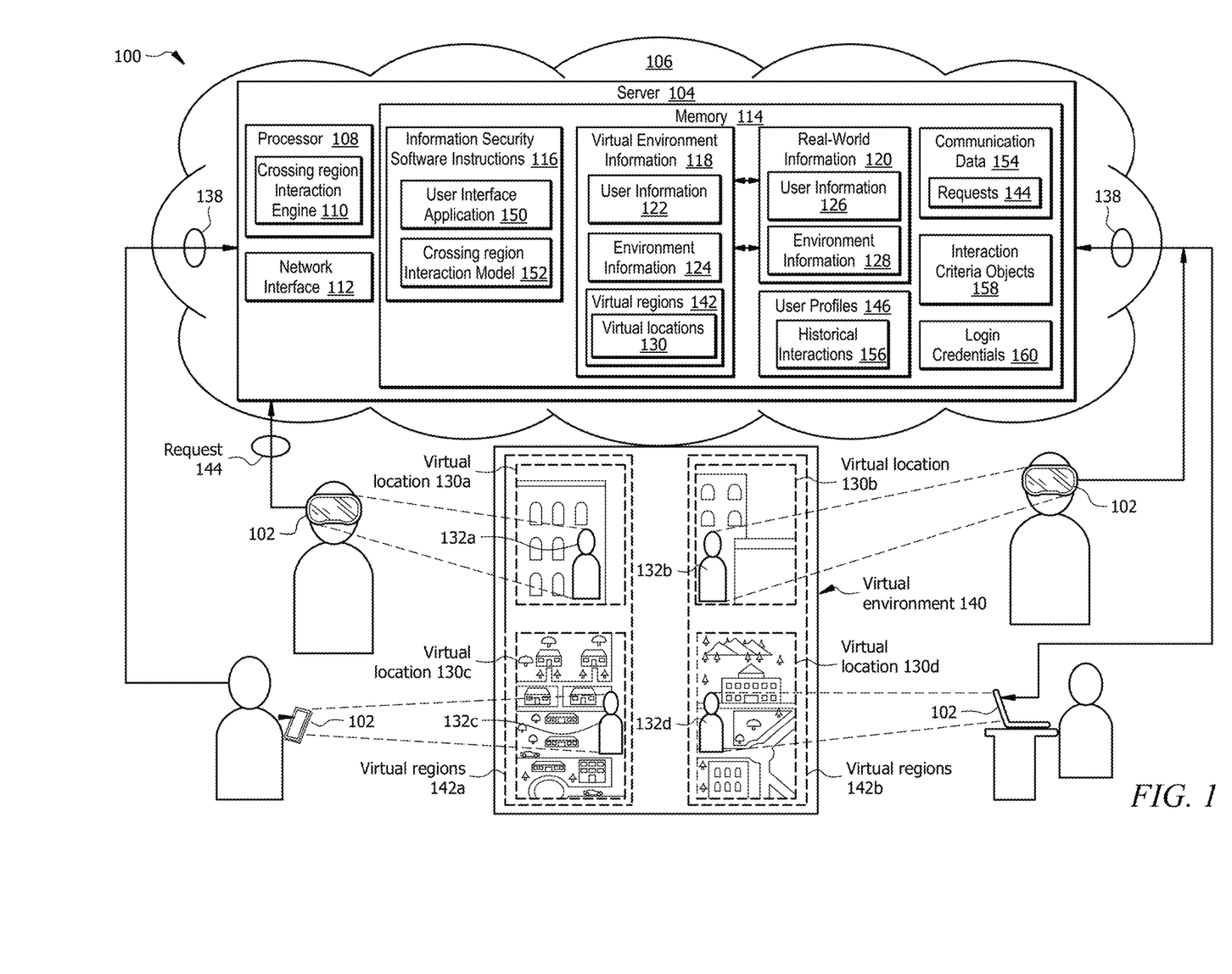
FIG. 1 illustrates an embodiment of a system configured to perform interactions across geographical regions in a virtual environment according to an embodiment of the present disclosure.
Figure 2:
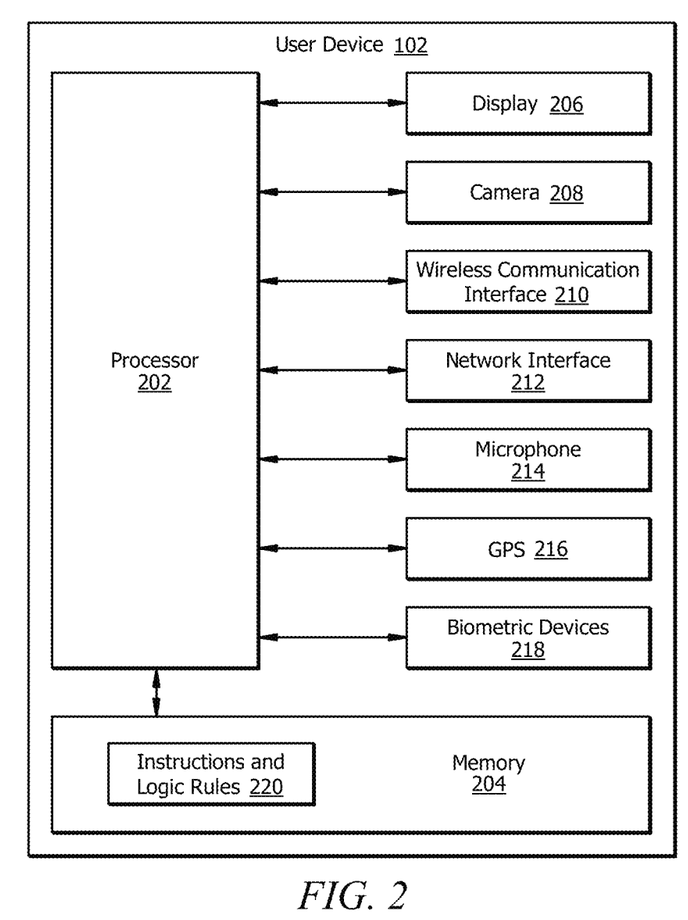
FIG. 2 is a block diagram of an example user device of the system of FIG. 1.
Figure 3:
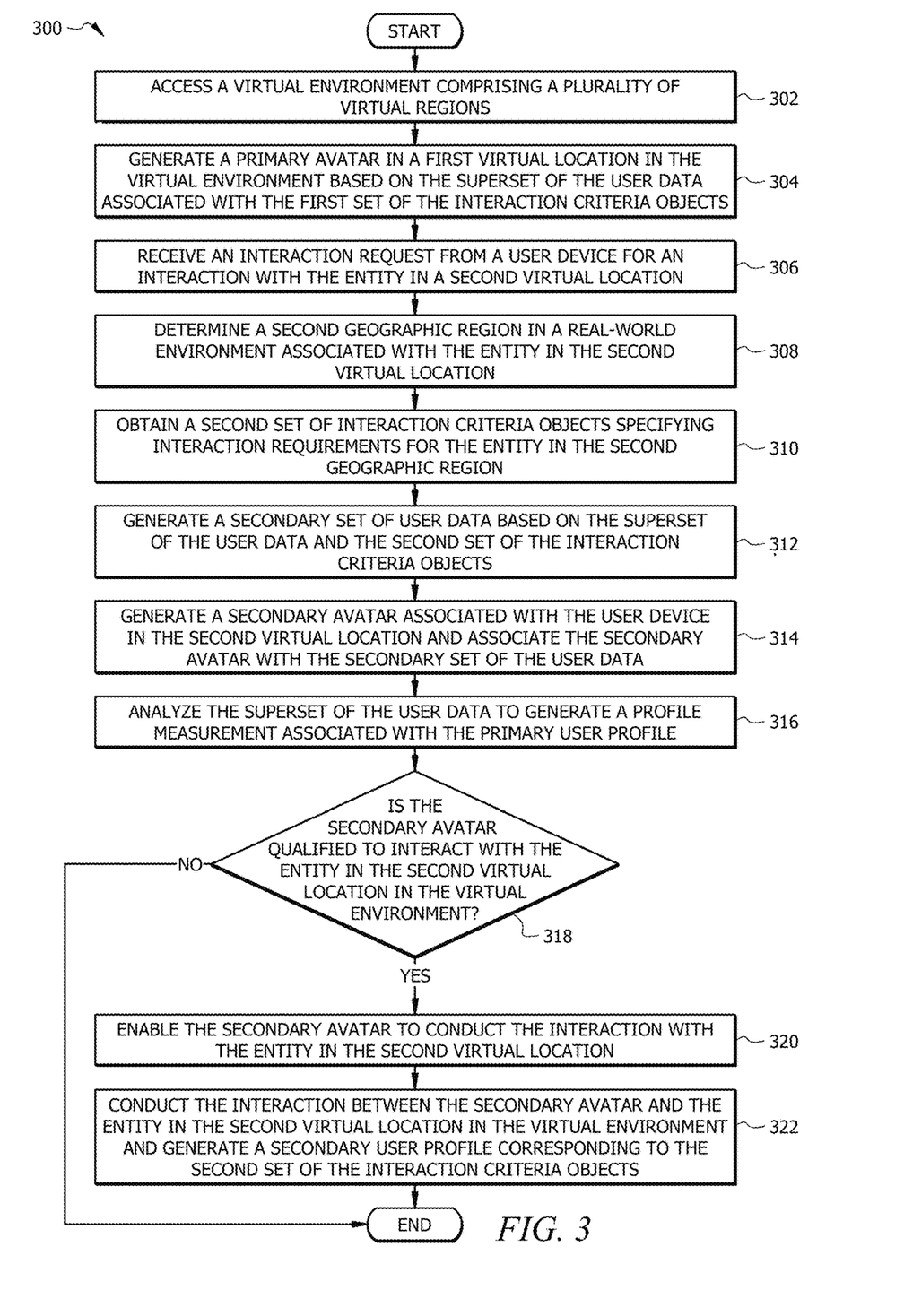
FIG. 3 is an example operational flow of a method for performing interactions across geographical regions in the virtual environment.

As described above, previous technologies fail to provide an effective and efficient solution to perform interactions with organizational entities across geographical regions in a network. This disclosure provides various systems and methods for users to perform interactions with organization entities across geographical regions in a network. FIG. 1 illustrates an embodiment of a system configured to perform interactions across geographical regions in a virtual environment according to an embodiment of the present disclosure. FIG. 2 is a block diagram of an example user device of the system of FIG. 1. FIG. 3 is an example operational flow of a method for performing interactions across geographical regions in the virtual environment.

Example System for Perform Interactions Across Geographical Regions in a Network FIG. 1 is a schematic diagram of an embodiment of a system 100 that is generally configured to preform interactions across geographical regions within a virtual environment 140. For example, the computer system 100 may be configured to provide services to users located in certain geographical regions for performing interactions with user profiles generated in other geographical regions in the virtual environment 140. This process may be employed to authenticate a user before allowing the user to perform communication actions or interactions compatible with different security network and interaction restrictions and requirements associated with certain geographical regions within the virtual environment 140.

In one embodiment, system 100 comprises a server 104, one or more user devices 102, and network 106. The system 100 may be communicatively coupled to a network 106 and may be operable to transmit data between each user device 102 and the server 104 through the network 106. Network 106 enables the communication between components of the system 100. Server 104 comprises a processor 108 in signal communication with a memory 114. Memory 114 stores information security software instructions 116 that when executed by the processor 108, cause the processor 108 to execute one or more functions described herein. For example, when the software instructions 116 are executed, the processor 108 implements a crossing region interaction engine 110 to process user profiles in response to a corresponding interaction request. The processor 108 executes and provides network communication for a user device 102 through a plurality of virtual regions 142 in virtual environment 140 in the network. In other embodiments, system 100 may not have all the components listed and/or may have other elements instead of, or in addition to, those listed above.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IOT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 140 to a user. Each user device 102 is further configured to allow a user to send a request for authenticating the user device 102 to access the virtual environment 140 and to interact with the server 104. As another example, a user may use a user device 102 to send an interaction request 144 that requests a transfer of real-world resources and/or virtual resources between the user device 102 and the server 104. Example processes are described in more detail below in FIG. 3.

Each user device 102 is configured to display a two-dimensional (2D) or three-dimensional (3D) representation of a virtual environment 140 to a user. Examples of a virtual environment 140 include, but are not limited to, a graphical or virtual representation of a metaverse, a map, a city, a building interior, a landscape, a fictional location, an alternate reality, or any other suitable type of location or environment. A virtual environment 140 may be configured to use realistic or non-realistic physics for the motion of objects within the virtual environment 140. Within the virtual environment 140, each user may be associated with a user device 102 and an avatar 132. An avatar 132 is a graphical representation of the user device 102 and the user within the virtual environment 140. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 140 to interact with one or more entities associated with the server 104 or other avatars 132 and objects within the virtual environment 140.

FIG. 2 is a block diagram of an embodiment of the user device 102 used by the system of FIG. 1. The user device 102 may be configured to display the virtual environment 140 (referring to FIG. 1) within a field of view of the user (referring to FIG. 1), capture biometric, sensory, and/or physical information of the user wearing and operating the user device 102, and to facilitate an electronic interaction between the user and the server 104 (referring to FIG. 1).

The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

The memory 204 is operable to store any of the information described with respect to FIGS. 1 and 3 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. For example, the memory 204 may store the instructions 220, which are described below for performing the functions of user device 102 with respect to FIGS. 1 and 3.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 140 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 140.

Camera 208 is configured to capture images of a wearer of the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network interface, a personal area network interface, a wide area network interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. Wireless communication interface 210 is configured to employ any suitable communication protocol.

The network interface 212 is configured to enable wired and/or wireless communications. The network interface 212 is configured to communicate data between the user device 102 and other network devices, systems, or domain(s). For example, the network interface 212 may comprise a WIFI interface, a local area network interface, a wide area network interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. Biometric device 218 is communicably coupled to processor 202.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of the crossing region interaction engine 110, as described further below in conjunction with the operational flow of the method 300 described in FIG. 3. In particular embodiments, the server 104 may be implemented in the cloud or may be organized in either a centralized or distributed manner.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute information security software instructions 116 to implement the crossing region interaction engine 110 and generate a virtual environment 140. In this way, processor 108 may be a special-purpose computer designed to implement the functions disclosed herein. In one embodiment, the processor 108 is implemented using logic units, FPGAs, ASICs, DSPs, or any other suitable hardware. In an embodiment, the crossing region interaction engine 110 is implemented using logic units, FPGAs, ASICS, DSPs, or any other suitable hardware. For example, the crossing region interaction engine 110 may be configured to provide within a real-world environment and a virtual environment 140 for a user to access and interact with one or more entities in the virtual environment 140. As another example, the crossing region interaction engine 110 may be configured to facilitate real-world resource and/or virtual resource transfers between users within a virtual environment 140. The crossing region interaction engine 110 may be configured to be executed by the processor 108 to perform the operations as described in FIG. 3.

The memory 114 is a hardware device that is operable to store any of the information described above with respect to FIGS. 1-3 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, communication data 154 including interaction requests 144, user profiles 146 including historical interactions 156 and interaction criteria objects 158, login credentials 160, virtual environment information 118, real-world information 120, avatars 132, virtual locations 130, virtual regions 142, virtual environment 140, and/or any other data or instructions. The user profiles 146 include a primary user profile including the superset of user data associated with a user account and historical interactions 156 occurred in a geographic region. In one embodiment, a memory 114 is operable to store a plurality of sets of interaction criteria objects in the user profiles 146. Each set of interaction criteria objects may specify a unique set of security network and interaction requirements for a user device with a corresponding user profile to securely access to and perform the interaction with a plurality of entities operating in a geographic region in a real-world environment.

The information security software instructions 116 may comprise any suitable set of instructions, logic, rules, or code operable to execute the crossing region interaction engine 110. In an example operation, the memory may store a user interface application 150, a crossing region interaction model 152, and other program models which executed by the processor 108 to implement operational flow of the system of FIG. 1.

The virtual environment information 118 comprises user information 122 and environment information 124. The user information 122 generally comprises information that is associated with any user profiles associated with user accounts that can be used within a virtual environment 140. For example, user information 122 may comprise user profile information, online account information, digital assets information, or any other suitable type of information that is associated with a user within a virtual environment 140. A user profile comprises one or more user login credentials 160 associated with a user account for a user device to access a virtual environment 140. The user profile may comprise one or more of user identifiers, username, physical address, email address, phone number, and any other data associated with the user account, such as documents, files, media items, etc. The plurality of user profiles may be stored by the processor 108 in the memory 114.

The environment information 124 generally comprises information about the appearance of a virtual environment 140. For example, the environment information 124 may comprise information associated with objects, landmarks, buildings, structures, avatars 132, virtual locations 130, virtual regions 142, or any other suitable type of element that is present within a virtual environment 140. In some embodiments, the environment information 124 may be used to create a representation of a virtual environment 140 for users. In this case, a virtual environment 140 may be implemented using any suitable type of software framework or engine.

Examples of a virtual environment 140 include, but are not limited to, a graphical or virtual representation of a metaverse, a map, a city, a building interior, a landscape, a fictional location, an alternate reality, or any other suitable type of location or environment. A virtual environment 140 may be configured to use realistic or non-realistic physics for the motion of objects within the virtual environment 140. For example, some virtual environment 140 may be configured to use gravity whereas other virtual environment 140 may not be configured to use gravity.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The user profile comprises one or more user login credentials 160 associated with a user account for a user device to access and interact with systems or platforms associated with one or more entities or sub-entities in a physical environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with one or more entities. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. For example, one or more user login credentials 160 associated with a user account for a user device to access the virtual environment are also used for the user device to access and interact with the systems or platforms associated with one or more entities or sub-entities in a physical environment. The server 104 may be configured to store one or more maps that translate or convert different types of interactions between the real world and the virtual environment 140 and vice-versa.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Crossing Region Interaction Engine

Crossing region interaction engine 110 may include, but is not limited to, one or more separate and independent software and/or hardware components of a server 104. In some embodiment, the crossing region interaction engine 110 may be implemented by the processor 108 by executing the information security software instructions 116 to create a virtual environment 140. The virtual environment 140 includes a plurality of virtual regions 142 each associated with one or more entities. Each entity provides one or more services in a geographical region. In some embodiments, the crossing region interaction engine 110 may be implemented by the processor 108 by executing the user interface application 150 and the crossing region interaction model 152 to process communication data 154 including an interaction request 144 from a user device 102 for performing interactions with an organization entity across different geographical regions through the virtual regions 142 in the virtual environment 140. The operation of the disclosed system 100 is described below.

Generating a Virtual Environment Including a Plurality of Virtual Locations

The server 104 may generate a virtual environment 140 based on the virtual environment information 118 and the real-world information 120. The virtual environment 140 may be a graphical or virtual representation of a metaverse, a map, a city, a building interior, a landscape, a fictional location, an alternate reality, or any other suitable type of location or environment. As illustrated in FIG. 1, the virtual environment 140 comprises a plurality of virtual locations 130 (e.g., 130a-130d) associated with corresponding virtual regions 142 (e.g., 142a and 142b) and geographical regions. Each virtual location 130 in the virtual environment is associated with at least one entity which operates and provides services in a geographical region in the real-world environment through the network. In one embodiment, each virtual location 130 may be configured and executed by the processor 108 to provide one or more services provided by an entity in a geographical region in the real-world environment. The server 104 may be configured to store one or more maps executed by the processor 108 that translate or convert different types of interactions occurred in the virtual location 130 between the real world and the virtual environment 140 and vice-versa.

Generating One or More Avatars in a Virtual Environment

Within the virtual environment 140, an avatar 132 is generated by the processor 108 as a graphical representation of a user device 102 within the virtual environment 140. The avatar 132 is associated with a corresponding user profile which may include one or more user identifiers, username, physical address, email address, phone number, documents associated with a user account and an entity. The avatar 132 includes a plurality of features and characteristics which are processed by the processor 108 to present the avatar 132 as the graphical representation of a user device 102 in the virtual environment 140.

For example, the server 104 may receive a signal indicating a physical location of the user device 102 and/or detect the user device 102 in the real-world environment. The server 104 may store the received signal in the memory 114. The server 104 may determine a virtual location of an avatar 132 associated with the user device 102 in the virtual environment 140 based on the physical location of the user device 102. The server 104 may obtain the environment information 124 and environment information 128 associated with the virtual location 130 and physical location of the user device 102.

In one embodiment, the server 104 may generate and present multiple avatars 132 (e.g., 132a-132d) based on user profiles 146 stored in the memory 114. The user profiles 146 may include historical interactions 156 between the user account and one or more entities in different geographic regions in the real-world environment. The memory stores a plurality of sets of interaction criteria objects 158 associated with different geographic regions in the real-world environment. Each set of interaction criteria objects specify a unique set of security network and interaction requirements for a user device with a corresponding user profile to securely access to and perform an interaction with a plurality of entities in a virtual environment. Each set of the interaction criteria objects may be associated with a unique geographic region and may include one or more objects of a geographic region (e.g., country or state), an interaction type, interaction exchange metrics, security communication and interaction protocols, software and hardware requirements, time, and language. The security communication and interaction protocols may include network channels, and interaction rules which are required for conducting interactions with entities operating in the corresponding geographic region. Each interaction criteria object may be represented as a unique alphanumeric value stored in the memory 114. For example, interaction exchange metrics may include currency rates between different geographic regions. In one embodiment, the server 104 may use the interaction exchange metrics to analyze a superset of the user data associated with the first geographic region to generate a secondary set of user data for a user device 102 to perform an interaction with an entity operating at a virtual location associated with the second geographic region.

The server 104 may generate and present multiple avatars 132 at different virtual locations 130. Each avatar may be associated with the same or different virtual region 142 corresponding to a geographic region in the real environment based on the corresponding historical interactions 156, interaction criteria objects 158, the obtained environment information 124 and environment information 128. Each avatar 132 may be generated by the server 104 based on user interactions occurred in each virtual location 130 corresponding to a virtual region 142 and a geographic region in the real-world environment. By using the user device 102, an avatar 132 can move or maneuver and interact with different entities, other avatars, and objects within the virtual environment 140. For example, the objects may be associated with fillable forms or documents, questions required for completing a task through the virtual environment 140, etc.

Authentication Process for Performing Interactions Across Geographical Regions in a Virtual Environment The server 104 may authorize a user device 102 to access the virtual environment 140 to interact with one or more entities at different virtual locations through the server 104. In an example operation, the server 104 may receive incoming communication data 154 from an avatar 132 through a user device 102 for accessing the virtual environment 140 via the network 106. The communication data 154 may include an interaction request 144 for completing a task by accessing the user profiles 146, establishing an interaction session to interact with one or more entities through the virtual environment 140. The one or more entities provide one or more services via the server 104 in the network 106. For example, the user may initiate the interaction request 144 by accessing a user interface application 150 through a user device 102 with one of the login credentials 160 for interacting with the server 104. The server 104 may verify the login credential 160 and authorize the avatar 132 associated with the user device 102 to enter the virtual environment 140. The server 104 may be further configured to generate an authentication token 138 and send it to the user device 102 via the network 106 to authorize the user device 102 to enter the virtual environment 140. The task may be predefined in a task flow determined by the server 104 based on the received communication data. The task or the task flow may be determined by the server 104 for the avatar 132 to perform corresponding interactions in the virtual environment 140.

The process of performing interactions across geographical regions in a virtual environment is described in detail in conjunction with the operational flow of the method 300 illustrated in FIG. 3.

Example Operational Flow for Performing Interactions Across Geographical Regions in a Virtual Environment FIG. 3 is an example operational flow of a method 300 of performing interactions across geographical regions in the virtual environment 140. Modifications, additions, or omissions may be made to method 300. Method 300 may include more, fewer, or other operations. For example, operations may be performed by the server 104 in parallel or in any suitable order. While at times discussed as the computer system 100, processor 108, crossing region interaction engine 110, user interface application 150, crossing region interaction model 152 or components of any of thereof performing operations, any suitable system or components of the system may perform one or more operations of the method 300. For example, one or more operations of method 300 may be implemented, at least in part, in the form of the information security software instructions 116 of FIG. 1, stored on non-transitory, tangible, machine-readable media (e.g., memory 114 of FIG. 1) that when run by one or more processors (e.g., processor 108 of FIG. 1) may cause the one or more processors to perform operations 302-322.

The method 300 begins at operation 302 where the server 104 accesses a virtual environment 140 that comprises a plurality of virtual locations 130 associated with the same or different virtual regions 142. For example, a virtual region 142a may include multiple virtual locations, such as 132a and 132c. A virtual region 142b may include multiple virtual locations, such as 132b and 132d. Each virtual location 130 is associated with at least one entity which provides one or more services in a virtual region 142 corresponding to a geographic region in the real-world environment via the network 106. In one embodiment, the user device 102 may log into the virtual environment 140 with their user login credentials 160 through the user interface application 150. In response to the user action, the server 104 may access a primary user profile 146 and obtain the superset of user data associated with a user account. The superset of the user data may include a first set of interaction criteria objects 158 and data of historical interactions 156 occurred between the user account and one or more entities in a first geographic region in the real-world environment. The first set of interaction criteria objects specify security network and interaction requirements for a user device with a corresponding user profile to securely access to and perform an interaction with an entity operating in the first geographic region in the real-world environment.

The superset of the user data is compatible with the first set of the interaction criteria objects.

At operation 304, the server 104 generates a primary avatar 132a at a first virtual location 130a in a first virtual region 142a based on a superset of the user data associated with a first set of the interaction criteria objects. The first virtual location 130a and an associated first entity are associated with the first virtual region 142a and a first geographic region where the entity operates in the real-world environment.

At operation 306, the server 104 receives an interaction request 144 from a user device 102 for an interaction with the entity at a second virtual location 130b in the virtual environment. The server 104 may receive a signal indicating a physical location of the user device 102 and detect the user device 102 moving in the real-world environment. The server 104 may determine the second virtual location 130b in the virtual environment based on the physical location of the user device 102. In one embodiment, the server 104 may receive a signal from the user device 102 and detect the user device 102 moving and entering the second virtual location 130b in the virtual environment 140.

At operation 308, the server 104 determines a second geographic region in a real-world environment associated with the entity at the second virtual location 130b in the second virtual region 142b. The second geographic region is different from the first geographic region.

At operation 310, the server 104 obtains a second set of interaction criteria objects 158 from the memory 114 associated with the second geographic region. The second set of interaction criteria objects 158 specify security network and interaction requirements for a user device with a corresponding user profile to securely access to and perform an interaction with the entity in the second geographic region in the real-world environment. The second set of the interaction criteria objects are different from the first set of the interaction criteria objects.

At operation 312, the server 104 generates a secondary set of user data based on the superset of the user data and the second set of the interaction criteria objects.

At operation 314, the server 104 generates a secondary avatar 132b associated with the user device 102 at the second virtual location 130b and associate the secondary avatar 132b with the secondary set of the user data.

The operations 308-314 may be employed to authenticate a user device 102 to perform communication actions or interactions with the entity at the second virtual location 130b.

At operation 316, the server 104 analyzes the superset of the user data and generates a profile measurement associated with the primary user profile. The profile measurement is a unique alphanumeric value indicating an evaluation of the historical interactions 156 occurred between the user account and the one or more entities in the first geographic region.

At operation 318, the server 104 determines whether the secondary avatar is qualified to interact with the entity at the second virtual location 130b in the virtual environment based on the profile measurement and the second set of the interaction criteria objects.

At operation 320, the server 104 enables the secondary avatar to conduct the interaction with the entity at the second virtual location 130b in the virtual environment in response to determining that the secondary avatar is qualified to interact with the entity at the second virtual location 130b in the virtual environment.

At operation 322, the server 104 conducts an interaction between the secondary avatar 132b and the entity at the second virtual location 130b in the second virtual region 142b based on the communication data 154 and the secondary set of user data. The server 104 generates a secondary user profile corresponding to the second set of the interaction criteria objects. The secondary user profile may be a subset of user data. The secondary user profile includes the secondary set of the user data, the second set of the interaction criteria objects and interaction data. The interaction data represents the interaction between the secondary avatar and the entity at the second virtual location 130b in the second virtual region 142b in the virtual environment 140. the server 104 updates the user profiles 146 with the secondary user profile and store them in the memory.

In some embodiments, software instructions 116 associated with the operational flow and other described processes may be deployed into a practical application executed by the server to implement any operations in virtual environment 140. The practical application may be implemented by the processor 108 to receive and process communication data 154 from user device 102 and generate a primary avatar 132a and a secondary avatar 132b. The primary avatar 132a is at the first virtual location 130a associated with the first geographical region. The secondary avatar 132b is associated with the user device 102 at the second virtual location 130b associated with the second geographical region. The practical application may be implemented by the processor 108 to authorize the avatar 132b to perform interactions across different geographical regions in the virtual environment 140 in real time while both geographical regions require different security network and interaction requirements on performing corresponding interactions. The user device 102 may perform interactions to complete a task predefined by the server 104 based on the communication data through avatar 132b via the network in real time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:
1. A system comprising:
a memory operable to store:
a plurality of sets of interaction criteria objects, wherein a particular set of interaction criteria objects allows a user device to perform an interaction with at least one entity in a geographic region of a real-world environment; and
a primary user profile comprising a superset of user data associated with a user account, wherein the superset of the user data comprises a first set of interaction criteria objects and data of historical interactions between the user account and one or more entities in a first geographic region in the real-world environment; and
a processor operably coupled to the memory, the processor configured to:
access a virtual environment comprising a plurality of virtual locations, wherein each virtual location in the virtual environment is associated with at least one entity operated in the real-world environment;
generate a primary avatar at a first virtual location in the virtual environment based at least in part upon the superset of the user data associated with the first set of the interaction criteria objects, wherein the first virtual location is associated with the first geographic region in the real-world environment;
receive an interaction request from a user device for an interaction with the entity at a second virtual location in the virtual environment;
determine a second geographic region in the real-world environment associated with the entity at the second virtual location in the virtual environment, the second geographic region being different from the first geographic region;
obtain a second set of interaction criteria objects to perform the interaction with the entity in the second geographic region in the real-world environment, the second set of the interaction criteria objects being different from the first set of the interaction criteria objects;
generate a secondary set of user data based at least in part upon the superset of the user data and the second set of the interaction criteria objects;
generate a secondary avatar associated with the user device at the second virtual location and associate the secondary avatar with the secondary set of the user data; and
conduct the interaction between the secondary avatar and the entity at the second virtual location in the virtual environment and generate a secondary user profile corresponding to the second set of the interaction criteria objects.

2. The system of claim 1, wherein the processor is further configured to:
analyze the superset of the user data and generate a profile measurement associated with the primary user profile, wherein the profile measurement is a unique alphanumeric value indicating an evaluation of the historical interactions between the user account and the one or more entities in the first geographic region; and
determine whether the secondary avatar is qualified to interact with the entity at the second virtual location in the virtual environment based on the profile measurement and the second set of the interaction criteria objects.

3. The system of claim 2, wherein the processor is further configured to:
in response to determining that the secondary avatar is qualified to interact with the entity at the second virtual location in the virtual environment,
enable the secondary avatar to conduct the interaction with the entity at the second virtual location in the virtual environment.

4. The system of claim 1, wherein the secondary user profile comprises the secondary set of the user data, the second set of the interaction criteria objects and interaction data representing the interaction between the secondary avatar and the entity at the second virtual location in the virtual environment.

5. The system of claim 1, wherein each set of the interaction criteria objects are associated with a unique geographic region and comprise at least one of the objects of a geographical region, an interaction type, interaction exchange metrics, or security communication and interaction protocols.

6. The system of claim 1, wherein the primary user profile and the secondary user profile comprise one or more user login credentials for the primary avatar and the secondary avatar to enter the virtual environment.

7. The system of claim 1, wherein the processor is further configured to:
receive a signal indicating a physical location of the user device in the real-world environment;
store the received signal in the memory; and
determine the second virtual location of the secondary avatar associated with the user device in the virtual environment based on the physical location of the user device.

8. A method comprising:
accessing a virtual environment comprising a plurality of virtual locations, wherein each virtual location in the virtual environment is associated with at least one entity operated in a real-world environment;
generating a primary avatar at a first virtual location in the virtual environment based on a superset of the user data associated with a first set of the interaction criteria objects, wherein the first virtual location is associated with the first geographic region in the real-world environment, and the first set of the interaction criteria objects allow a user device to perform an interaction with an entity operated in the real-world environment;
receiving an interaction request from a user device for an interaction with the entity at a second virtual location in the virtual environment;
determining a second geographic region in the real-world environment associated with the entity at the second virtual location in the virtual environment, the second geographic region being different from the first geographic region;
obtaining a second set of interaction criteria objects to perform an interaction with the entity in the second geographic region in the real-world environment, the second set of the interaction criteria objects being different from the first set of the interaction criteria objects;
generating a secondary set of user data based on the superset of the user data and the second set of the interaction criteria objects;
generating a secondary avatar associated with the user device at the second virtual location and associate the secondary avatar with the secondary set of the user data; and
conducting the interaction between the secondary avatar and the entity at the second virtual location in the virtual environment and generating a secondary user profile corresponding to the second set of the interaction criteria objects.

9. The method of claim 8, further comprising:
analyzing the superset of the user data and generate a profile measurement associated with the primary user profile, wherein the profile measurement is a unique alphanumeric value indicating an evaluation of the historical interactions between the user account and the one or more entities in the first geographic region; and
determining whether the secondary avatar is qualified to interact with the entity at the second virtual location in the virtual environment based on the profile measurement and the second set of the interaction criteria objects.

10. The method of claim 9, further comprising:
in response to determining that the secondary avatar is qualified to interact with the entity at the second virtual location in the virtual environment,
enabling the secondary avatar to conduct the interaction with the entity at the second virtual location in the virtual environment.

11. The method of claim 8, wherein the secondary user profile comprises the secondary set of the user data, the second set of the interaction criteria objects and interaction data representing the interaction between the secondary avatar and the entity at the second virtual location in the virtual environment.

12. The method of claim 8, wherein each set of the interaction criteria objects are associated with a unique geographic region and comprise at least one of the objects of a geographical region, an interaction type, interaction exchange metrics, or security communication and interaction protocols.

13. The method of claim 8, wherein the primary user profile and the secondary user profile comprise one or more user login credentials for the primary avatar and the secondary avatar to enter the virtual environment.

14. The method of claim 8, further comprising:
receiving a signal indicating a physical location of the user device in the real-world environment;
storing the received signal in a memory; and
determining the second virtual location of the secondary avatar associated with the user device in the virtual environment based on the physical location of the user device.

15. A non-transitory computer-readable medium storing instructions that when executed by a processor, cause the processor to:
access a virtual environment comprising a plurality of virtual locations, wherein each virtual location in the virtual environment is associated with at least one entity operated in the real-world environment;

generate a primary avatar at a first virtual location in the virtual environment based on a superset of the user data associated with a first set of the interaction criteria objects, wherein the first virtual location is associated with the first geographic region in a real-world environment, and the first set of the interaction criteria objects allow a user device to perform the interaction with an entity operated in the real-world environment;

receive an interaction request from a user device for an interaction with the entity at a second virtual location in the virtual environment;

determine a second geographic region in the real-world environment associated with the entity at the second virtual location in the virtual environment, the second geographic region being different from the first geographic region;

obtain a second set of interaction criteria objects to perform the interaction with the entity in the second geographic region in the real-world environment, the second set of the interaction criteria objects being different from the first set of the interaction criteria objects;

generate a secondary set of user data based on the superset of the user data and the second set of the interaction criteria objects;

generate a secondary avatar associated with the user device at the second virtual location and associate the secondary avatar with the secondary set of the user data; and conduct the interaction between the secondary avatar and the entity at the second virtual location in the virtual environment and generate a secondary user profile corresponding to the second set of the interaction criteria objects.

16. The non-transitory computer-readable medium of claim 15, wherein the instructions when executed by the processor further cause the processor to:

analyze the superset of the user data and generate a profile measurement associated with the primary user profile, wherein the profile measurement is a unique alphanumeric value indicating an evaluation of the historical interactions between the user account and the one or more entities in the first geographic region; and determine whether the secondary avatar is qualified to interact with the entity at the second virtual location in the virtual environment based on the profile measurement and the second set of the interaction criteria objects.

17. The non-transitory computer-readable medium of claim 16, wherein the instructions when executed by the processor further cause the processor to:

in response to determining that the secondary avatar is qualified to interact with the entity at the second virtual location in the virtual environment, enable the secondary avatar to conduct the interaction with the entity at the second virtual location in the virtual environment.

18. The non-transitory computer-readable medium of claim 15, wherein the secondary user profile comprises the secondary set of the user data, the second set of the interaction criteria objects and interaction data representing the interaction between the secondary avatar and the entity at the second virtual location in the virtual environment; and wherein each set of the interaction criteria objects are associated with a unique geographic region and comprise at least one of the objects of a geographical region, an interaction type, interaction exchange metrics, or security communication and interaction protocols.

19. The non-transitory computer-readable medium of claim 15, wherein the primary user profile and the secondary user profile comprise one or more user login credentials for the primary avatar and the secondary avatar to enter the virtual environment.

20. The non-transitory computer-readable medium of claim 15, wherein the instructions when executed by the processor further cause the processor to:

receive a signal indicating a physical location of the user device in the real-world environment;

store the received signal in a memory; and determine the second virtual location of the secondary avatar associated with the user device in the virtual environment based on the physical location of the user device.

* * * * *